United States Patent
Umehara (10) Patent No.: US 10,411,246 B2
(45) Date of Patent: Sep. 10, 2019

(54) ELECTRODE AND METHOD OF MANUFACTURING ELECTRODE

(71) Applicant: TOYOTA JIDOSHA KABUSHIKI KAISHA, Toyota-shi, Aichi-ken (JP)

(72) Inventor: Masakazu Umehara, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 294 days.

(21) Appl. No.: 15/160,693

(22) Filed: May 20, 2016

(65) Prior Publication Data

US 2016/0351885 A1    Dec. 1, 2016

(30) Foreign Application Priority Data

May 28, 2015   (JP) ................ 2015-108788

(51) Int. Cl.
| | |
|---|---|
| H01M 4/02 | (2006.01) |
| H01M 4/04 | (2006.01) |
| H01M 4/139 | (2010.01) |
| H01M 4/62 | (2006.01) |
| H01M 10/0525 | (2010.01) |

(52) U.S. Cl.
CPC ......... *H01M 4/0402* (2013.01); *H01M 4/139* (2013.01); *H01M 4/62* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 6,387,564 | B1 * | 5/2002 | Yamashita | H01M 2/164 29/623.3 |
| 2003/0224242 | A1 * | 12/2003 | Kaito | H01M 2/08 429/94 |
| 2007/0264577 | A1 * | 11/2007 | Katayama | H01M 2/162 429/246 |
| 2009/0098446 | A1 | 4/2009 | Okada et al. | |
| 2013/0011709 | A1 * | 1/2013 | Saito | H01M 4/13 429/94 |
| 2014/0045057 | A1 | 2/2014 | Tode et al. | |
| 2014/0087222 | A1 | 3/2014 | Yamane et al. | |

(Continued)

FOREIGN PATENT DOCUMENTS

| | | |
|---|---|---|
| EP | 1 018 775 A1 | 7/2000 |
| JP | 2001-093583 A | 4/2001 |
| JP | 200821644 A | 1/2008 |

(Continued)

*Primary Examiner* — Alix E Eggerding
(74) *Attorney, Agent, or Firm* — Sughrue Mion, PLLC (57) ABSTRACT

An electrode includes: a current collector that is made of a conductive material; a mixture layer that contains an active material and is arranged on one surface of the current collector; a thermoplastic resin particle layer in which a plurality of insulating thermoplastic resin particles are arranged on the mixture layer; and a porous inorganic oxide particle layer that contains plural insulating inorganic oxide particles and is arranged on an edge surface of a laminate including the current collector, the mixture layer, and the thermoplastic resin particle layer. A melting point of the inorganic oxide particles is higher than a melting point of the thermoplastic resin particles.

5 Claims, 9 Drawing Sheets

(56) References Cited

U.S. PATENT DOCUMENTS

2016/0133934 A1     5/2016   Tode et al.
2018/0145376 A1*   5/2018   Jo ..................... H01M 10/4235

FOREIGN PATENT DOCUMENTS

| JP | 200937833 A | 2/2009 |
| JP | 2009-099558 A | 5/2009 |
| JP | 2013-77467 A | 4/2013 |
| JP | 2014-35925 A | 2/2014 |
| JP | 201482193 A | 5/2014 |
| JP | 201588369 A | 5/2015 |
| WO | 2015/001716 A1 | 1/2015 |

* cited by examiner

ELECTRODE AND METHOD OF MANUFACTURING ELECTRODE

INCORPORATION BY REFERENCE

The disclosure of Japanese Patent Application No. 2015-108788 filed on May 28, 2015 including the specification, drawings and abstract is incorporated herein by reference in its entirety.

BACKGROUND OF THE INVENTION

1. Field of the Invention

The present invention relates to an electrode and a method of manufacturing an electrode.

2. Description of Related Art

Recently, a secondary battery used in an electric vehicle (EV) or a hybrid electric vehicle (HEV) has been actively developed.

As a secondary battery, a lithium ion secondary battery having high theoretical energy has attracted attention, and the development thereof is currently rapidly progressing. In general, a lithium ion secondary battery has a configuration in which a positive electrode and a negative electrode are connected to each other through an electrolyte layer and are accommodated in a battery case, a mixture including a positive electrode active material and a binder is applied to both surfaces of a positive electrode current collector, and a mixture including a negative electrode active material and a binder is applied to both surfaces of a negative electrode current collector.

When this lithium ion secondary battery is continuously overcharged, the reductive decomposition or oxidative decomposition of an electrolytic solution occurs in the battery, and oxygen is released due to the decomposition of the positive electrode. In some cases, lithium metal is deposited on the negative electrode, and the battery voltage and the battery temperature increases, which may cause short-circuiting.

Regarding this problem, Japanese Patent Application Publication No. 2001-93583 (JP 2001-93583 A) discloses a configuration in which a porous film formed of a thermoplastic polymer is provided between a positive electrode and a negative electrode and is provided on edge surfaces of the positive electrode and on edge surfaces of the negative electrode such that the thermoplastic polymer is melted in a case where an electrode is heated by overcharging or the like. By the thermoplastic polymer being melted, pores of the porous film are blocked, and the movement of a current or ions between the positive electrode and the negative electrode are blocked, which prevents short-circuiting.

However, in the electrode disclosed in JP 2001-93583 A, there is a problem of poor heat dissipation because, in a case where the electrode is heated by overcharging or the like, the thermoplastic polymer is melted and blocks the pores of the porous film.

SUMMARY OF THE INVENTION

The invention provides: an electrode having satisfactory heat dissipation even after being heated by overcharging or the like; and a method of manufacturing the electrode.

According to a first aspect of the invention, there is provided an electrode including: a current collector that is made of a conductive material; a mixture layer that contains an active material and is arranged on one surface of the current collector; a thermoplastic resin particle layer in which a plurality of insulating thermoplastic resin particles are arranged on the mixture layer; and a porous inorganic oxide particle layer that contains a plurality of insulating inorganic oxide particles and is arranged on an edge surface of a laminate including the current collector, the mixture layer, and the thermoplastic resin particle layer. A melting point of the inorganic oxide particles is higher than a melting point of the thermoplastic resin particles.

According to the first aspect of the invention, a porous inorganic oxide particle layer, which contains plural insulating inorganic oxide particles, is arranged on an edge surface of a laminate including a current collector, a mixture layer, and a thermoplastic resin particle layer in which plural insulating thermoplastic resin particles are arranged on the mixture layer. As a result, in a case where the electrode is heated by overcharging or the like, the thermoplastic resin particle layer is melted and blocks pores, and thus the movement of a current and ions between the positive electrode and the negative electrode is blocked. On the other hand, the inorganic oxide particle layer having a higher melting point than the thermoplastic resin particles still have pores without being melted, thereby exhibiting satisfactory heat dissipation.

According to a second aspect of the invention, there is provided a method of manufacturing an electrode, the method including: forming a first mixture layer by arranging a mixture, which contains an active material, on a first current collector made of a conductive material; forming a first thermoplastic resin particle layer by arranging a plurality of insulating thermoplastic resin particles on the first mixture layer; arranging a spacer at a position which is offset from a first edge surface of a first laminate including the first current collector, the first mixture layer, and the first thermoplastic resin particle layer so as not to protrude from the first edge surface; and performing the following (i) or (ii). (i) includes: laminating one portion of the first laminate on another portion of the first laminate with the spacer interposed therebetween; and arranging an inorganic oxide particle layer by applying inorganic oxide particles having a higher melting point than the thermoplastic resin particles to the first edge surface. (ii) includes: laminating a second laminate laminating a second current collector, a second mixture layer and a second thermoplastic resin particle layer in this order on the first laminate with the spacer interposed therebetween; and arranging an inorganic oxide particle layer by applying inorganic oxide particles having a higher melting point than the thermoplastic resin particles to the first edge surface and a second edge surface, which is on the same side of the first edge surface, of the second laminate.

According to the second aspect of the invention, the spacer is arranged at a position which is offset from the edge surface of the laminate including the current collector, the mixture layer, and the thermoplastic resin particle layer, the laminate and the spacer are alternately laminated, and the inorganic oxide particles are applied to the edge surface of the laminate. As a result, by performing the application once, the inorganic oxide particle layer can be formed on the edge surface of the laminate.

According to the invention, the insulating porous inorganic oxide particle layer, which is made of particles having a higher melting point than the thermoplastic resin, is arranged on the edge surface of the laminate including the current collector, the mixture layer, and the porous thermoplastic resin particle layer which is made of plural particles of the thermoplastic resin. As a result, the electrode can exhibit satisfactory heat dissipation even after being heated by overcharging or the like.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described using a positive electrode for a lithium secondary battery and the manufacturing of the positive electrode as an example.

Figure 1:
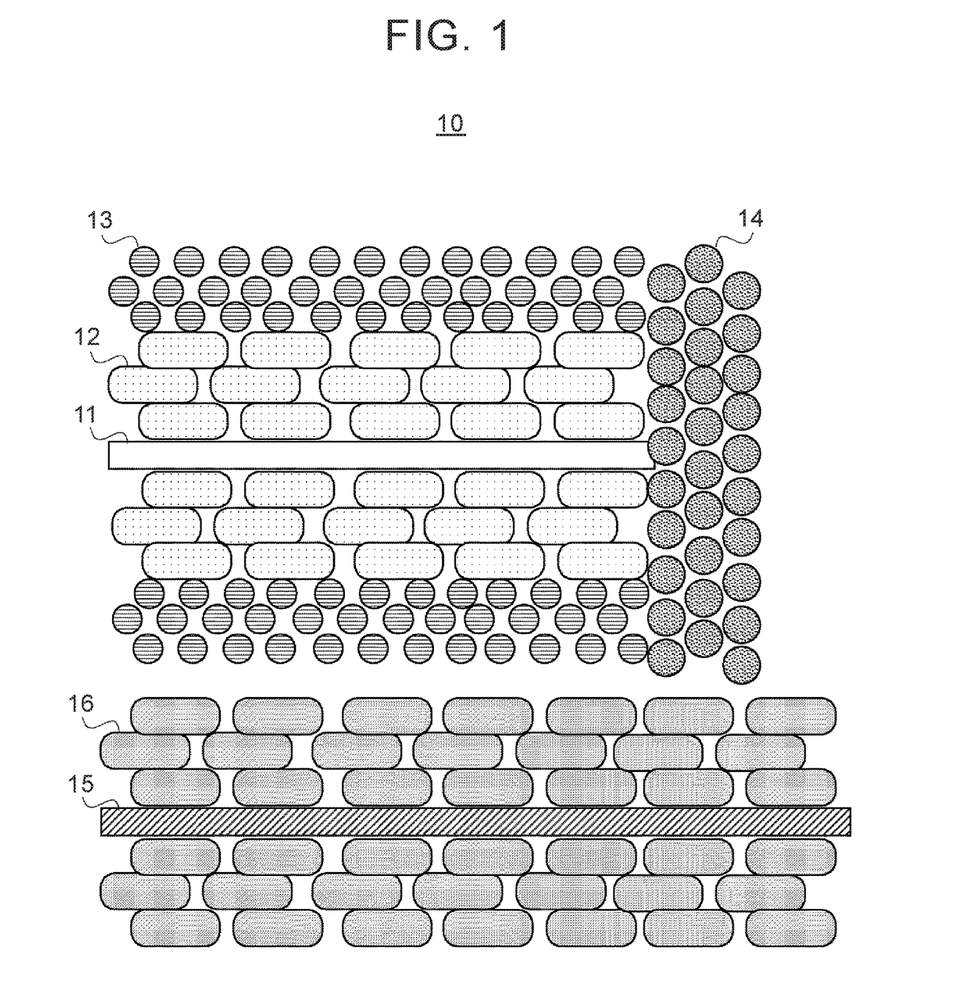
FIG. 1 is a schematic diagram showing a configuration of an electrode body according to an embodiment of the invention.

Hereinafter, the embodiment of the invention will be described with reference to the drawings. FIG. 1 is a schematic diagram showing a configuration of an electrode body including an electrode according to the embodiment. In FIG. 1, an electrode body 10 includes a positive electrode current collector 11, a positive electrode mixture layer 12, a thermoplastic resin particle layer 13, an inorganic oxide particle layer 14, a negative electrode current collector 15, and a negative electrode mixture layer 16.

The positive electrode current collector 11 is formed of a conductive material and releases electrons, which have been stored by the positive electrode mixture layer 12 through a reduction reaction, to the outside of the positive electrode current collector 11. For example, it is preferable that the positive electrode current collector 11 has a thin film shape having a plane to laminate the positive electrode mixture layer. As the positive electrode current collector 11, a conductive member formed of a highly conductive metal may be used as in the case of an electrode current collector used in a positive electrode of a nonaqueous electrolyte secondary battery (typically, a lithium secondary battery) in the related art.

For example, the positive electrode current collector 11 may be made of a metal such as aluminum, nickel, titanium, or iron, or an alloy containing one of the above-described metals as a major component. It is more preferable that the positive electrode current collector 11 is formed of aluminum or an aluminum alloy. A shape of the positive electrode current collector is not particularly limited, and various shapes can be adopted in consideration of the desired shape of a secondary battery and the like. For example, various shapes such as a rod shape, a plate shape, a sheet shape, a foil shape, or a mesh shape may be adopted. Typically, a sheet-shaped positive electrode current collector formed of aluminum is used.

The positive electrode mixture layer 12 contains at least an active material, which stores electrons through a reduction reaction, and is arranged on the positive electrode current collector 11.

In the thermoplastic resin particle layer 13, plural thermoplastic resin particles are arranged on the positive electrode mixture layer 12. In a case where the electrode is heated by overcharging or the like, the thermoplastic resin particle layer 13 is melted and blocks pores. As a result, the movement of a current and ions between the positive electrode and the negative electrode is blocked, which prevents short-circuiting. For example, as a thermoplastic resin used in the thermoplastic resin particle layer 13, polyethylene is preferable.

The inorganic oxide particle layer 14 has a wall shape covering an edge surface of a laminate, which includes the positive electrode current collector 11, the positive electrode mixture layer 12, and the thermoplastic resin particle layer 13, and is a porous body formed of inorganic oxide particles. Here, the edge surface of the laminate is parallel to a laminating direction of the laminate. That is, the inorganic oxide particle layer 14 has a structure which is formed to be substantially parallel to the laminating direction of the laminate and to be in contact with the edge surface. In addition, the inorganic oxide particle layer 14 is formed of a material having a higher melting point than that of the thermoplastic resin particle layer 13. Further, it is preferable that the inorganic oxide particle layer 14 is formed of a material having a melting point higher than a temperature which is assumed during heating such as overcharging. For example, it is preferable that the inorganic oxide particle layer 14 is formed of an inorganic oxide such as alumina.

The negative electrode current collector 15 is formed of a conductive material and releases electrons, which have been stored from the outside of the negative electrode current collector 15, to the negative electrode mixture layer 16.

The negative electrode mixture layer 16 contains at least an active material, which releases electrons through an oxidation reaction, and is arranged on the negative electrode current collector 15.

The electrode body 10 having the above-described configuration functions as a battery, which generates electromotive force, through a chemical reaction using an electrolyte between a positive electrode body and a negative electrode body, the positive electrode body including the positive electrode current collector 11, the positive electrode mixture layer 12, and the thermoplastic resin particle layer 13, and the negative electrode body including the negative electrode current collector 15 and the negative electrode mixture layer 16.

Figure 2:
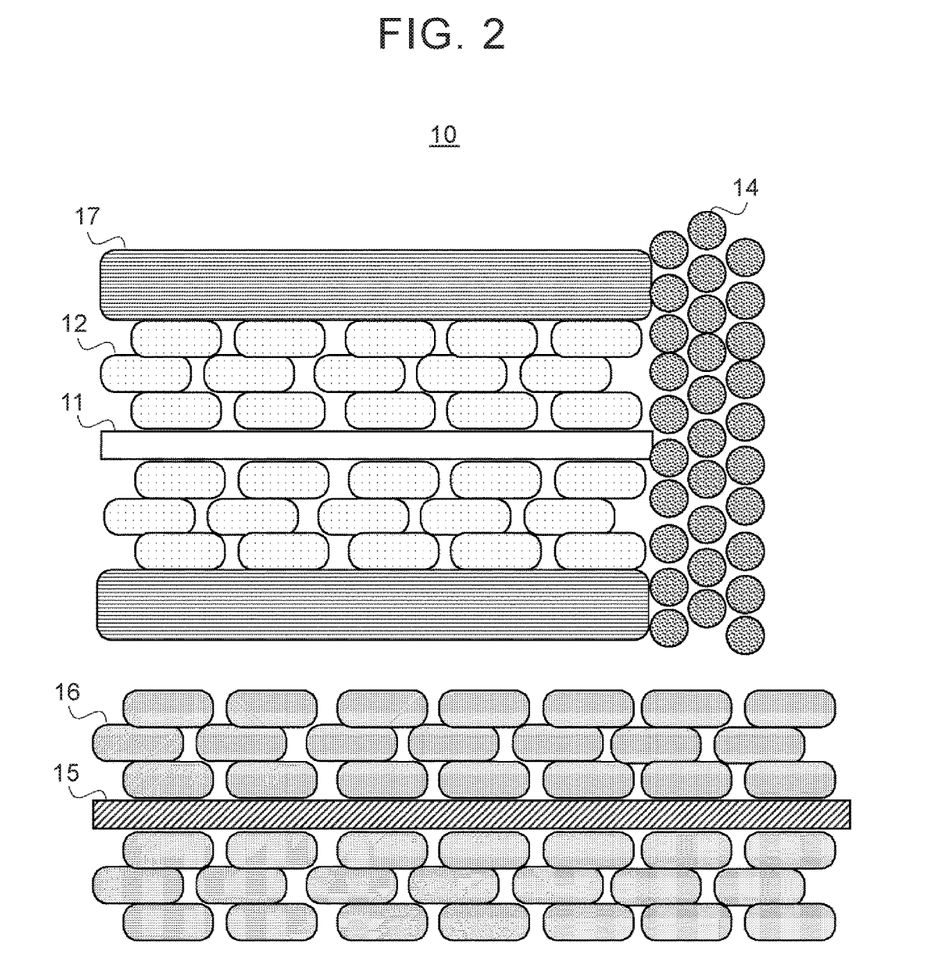
FIG. 2 is a schematic diagram showing a state of an electrode body during heating.

Further, this battery has a shutdown function of preventing short-circuiting during heating such as overcharging. This shutdown function will be described in FIG. 2. FIG. 2 is a schematic diagram showing a state of the electrode body during heating. In FIG. 2, the same components as those in FIG. 1 are represented by the same reference numerals, and the description thereof will not be repeated.

In a case where the electrode is heated by overcharging or the like, the thermoplastic resin particle layer 13 of FIG. 1, which is a porous body formed of a thermoplastic resin, is melted and blocks pores between the thermoplastic resin particles. In FIG. 2, the thermoplastic resin layer 17 is obtained after the thermoplastic resin particle layer 13 of FIG. 1 blocks the pores between the thermoplastic resin particles by being melted. By the pores being blocked, the movement of ions between the positive electrode current collector 11 and the positive electrode mixture layer 12, and the negative electrode current collector 15 and the negative electrode mixture layer 16 is blocked, which prevents a current flow. As a result, short-circuiting between the electrodes can be prevented.

Here, the melting point of the inorganic oxide particle layer 14 is higher than that of the thermoplastic resin particle layer 13, and is also higher than a temperature which is assumed during heating such as overcharging. Therefore, a state where the pores between the inorganic oxide particles are not blocked is maintained. That is, in the inorganic oxide particle layer 14, a state where heat is more likely to move than in the molten thermoplastic resin particle layer 13 is maintained.

Figure 3:
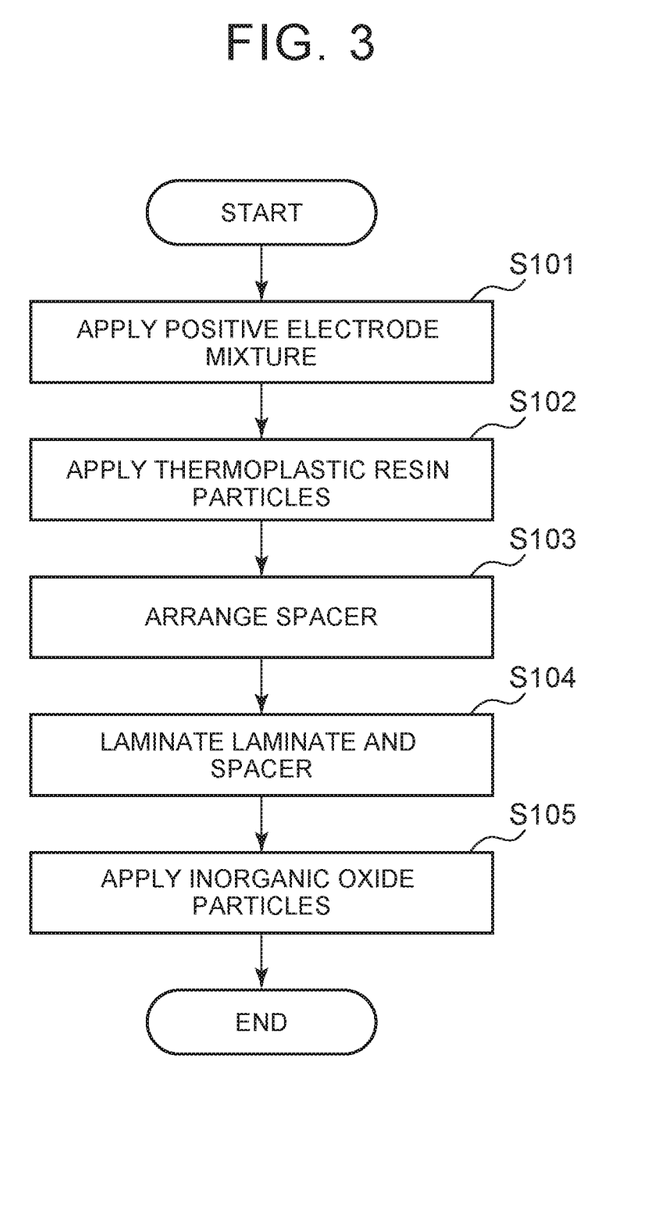
FIG. 3 is a flowchart showing a method of manufacturing an electrode according to an embodiment of the invention.
Figure 4A:
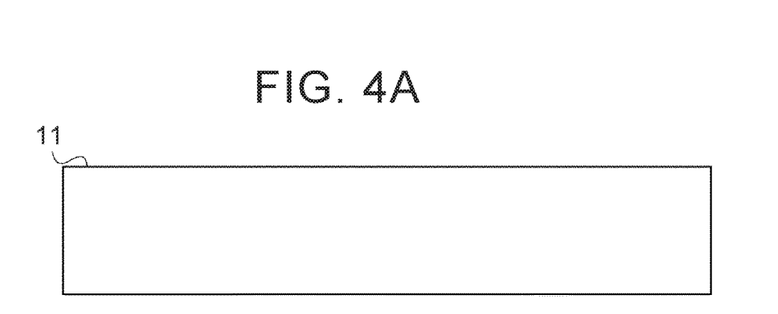
FIG. 4A is a diagram showing the method of manufacturing an electrode according to the embodiment.

Next, a method of manufacturing an electrode according to the embodiment will be described. FIG. 3 is a flowchart showing a method of manufacturing an electrode according to the embodiment. FIGS. 4A to 4D are diagrams showing the method of manufacturing an electrode according to the embodiment. FIGS. 4A to 4D shows an example of forming the inorganic oxide particle layer 14 on a long side of the belt-shaped positive electrode current collector 11. First, as shown in FIG. 4A, the belt-shaped positive electrode current collector 11 is prepared.

Figure 4B:
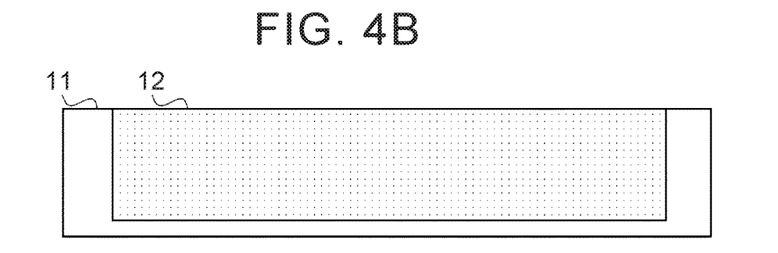
FIG. 4B is a diagram showing the method of manufacturing an electrode according to the embodiment.

In Step S101 of FIG. 3, as shown in FIG. 4B, a paste-like positive electrode mixture is applied to the positive electrode current collector 11. As a result, the positive electrode mixture layer 12 is arranged on the positive electrode current collector 11 made of a conductive material. Specifically, the positive electrode mixture is applied to the entire region of the positive electrode current collector 11 excluding belt-shaped opposite ends, which are held by winding or the like, and a end portion on one long side to which a terminal is welded.

For example, the positive electrode mixture layer 12 is prepared as a composition including a particulate positive electrode active material, a paste-like carbon composition, a binder, and a solvent. For the formation of the positive electrode mixture layer 12, well-known various application devices can be used. For example, an appropriate application device such as a slit coater, a die coater, a comma coater, or a gravure coater can be preferably used. The coating amount of the positive electrode mixture layer 12 is not particularly limited and can be arbitrarily set according to, for example, the use of a secondary battery including a desired electrode. For example, the coating amount of the positive electrode mixture layer 12 can be appropriately set within a range of about 3 mg/cm$^2$ to 50 mg/cm$^2$.

Figure 4C:
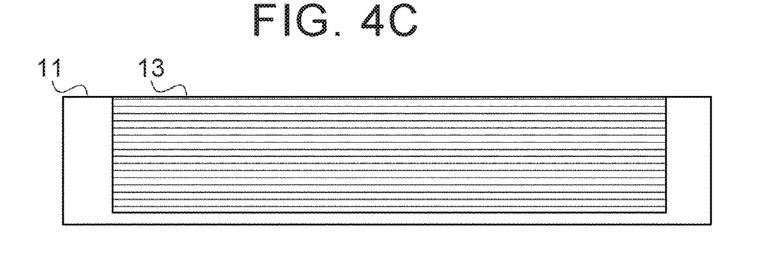
FIG. 4C is a diagram showing the method of manufacturing an electrode according to the embodiment.

Next, in Step S102 of FIG. 3, as shown in FIG. 4C, after the positive electrode mixture layer 12 is dried, thermoplastic resin particles made of a thermoplastic resin are applied thereto. As a result, the thermoplastic resin particle layer 13 is formed. Specifically, the thermoplastic resin particles are applied to the entire region on which the positive electrode mixture layer 12 is formed. In the step of forming the thermoplastic resin particle layer, polymer particles are supplied to the positive electrode mixture layer 12, for example, by being applied thereto, As a result, the thermoplastic resin particle layer 13 is formed on the positive electrode mixture layer 12. For the application of the polymer particles, well-known various application devices can be used. For example, an appropriate application device such as a slit coater, a die coater, a comma coater, or a gravure coater can be preferably used.

Figure 4D:
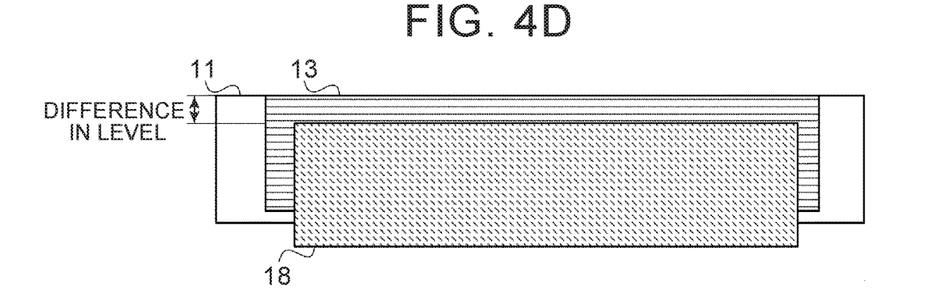
FIG. 4D is a diagram showing the method of manufacturing an electrode according to the embodiment.

Next, in Step S103 of FIG. 3, as shown in FIG. 4D, a spacer 18 having a flat plate shape is arranged on the thermoplastic resin particle layer 13. The spacer 18 is arranged at a position which is offset from a first edge surface of a laminate including the positive electrode current collector 11, the positive electrode mixture layer 12, and the thermoplastic resin particle layer 13 so as not to protrude from the first edge surface. Here, the first edge surface of the laminate is a surface on which the inorganic oxide particle layer 14 is formed. Specifically, the spacer 18 is arranged at a position which is offset in a direction retracting from the long side on which the inorganic oxide particle layer 14 is formed.

Next, in Step S104 of FIG. 3, the laminate and the spacer are alternately laminated. For example, the positive electrode current collector 11, the positive electrode mixture layer 12, the thermoplastic resin particle layer 13, and the spacer 18 are arranged and then are wound around a short side as an axis. As a result, one portion of the laminate including the positive electrode current collector 11, the positive electrode mixture layer 12 and the thermoplastic resin particle layer 13 and another portion of the laminate are laminated with the spacer 18 interposed therebetween.

Figure 5:
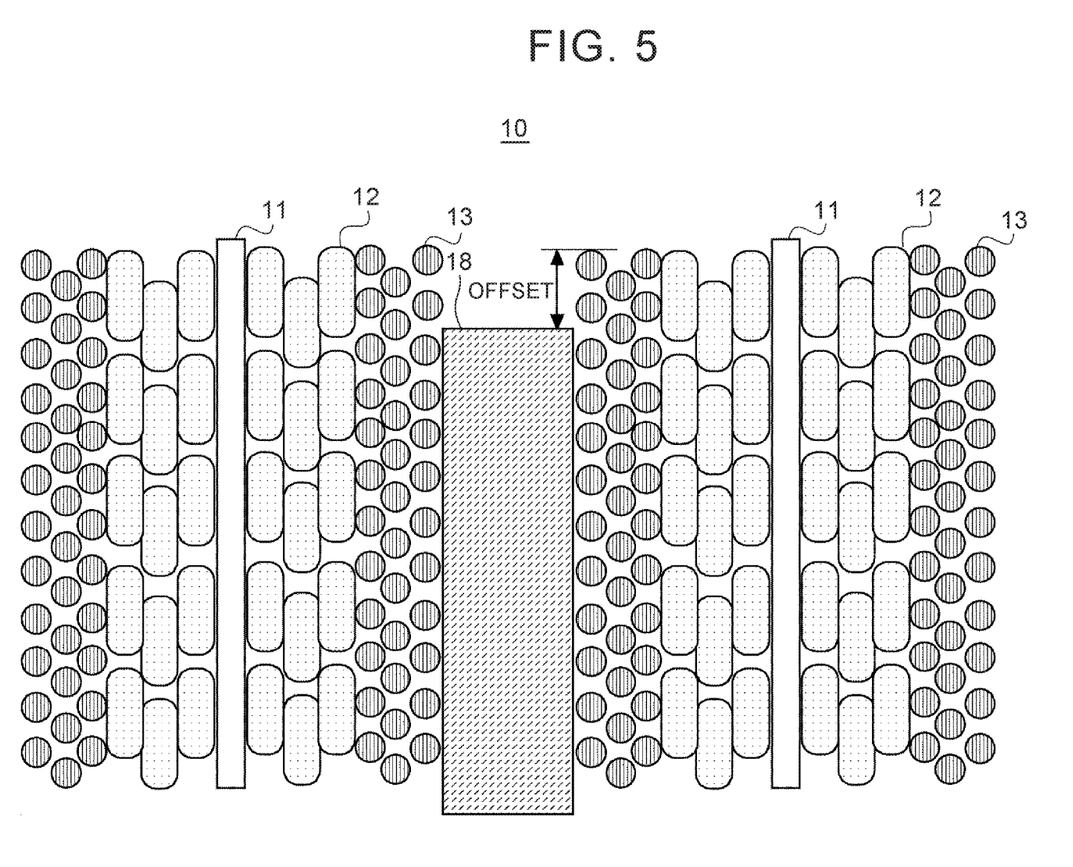
FIG. 5 is a sectional view showing an electrode and a spacer in the method of manufacturing an electrode according to the embodiment.

FIG. 5 shows an example in which the laminate and the spacer are alternately laminated. FIG. 5 is a sectional view showing the electrode and the spacer in the method of manufacturing an electrode according to the embodiment. FIG. 5 is a sectional view showing a surface perpendicular to a lamination surface. As shown in FIG. 5, the spacer 18 is arranged at a position which is offset from a first edge surface of a laminate including the positive electrode current collector 11, the positive electrode mixture layer 12, and the thermoplastic resin particle layer 13 so as not to protrude from the first edge surface. The spacer 18 forms a concave portion on the first edge surface of the laminate.

Figure 6:
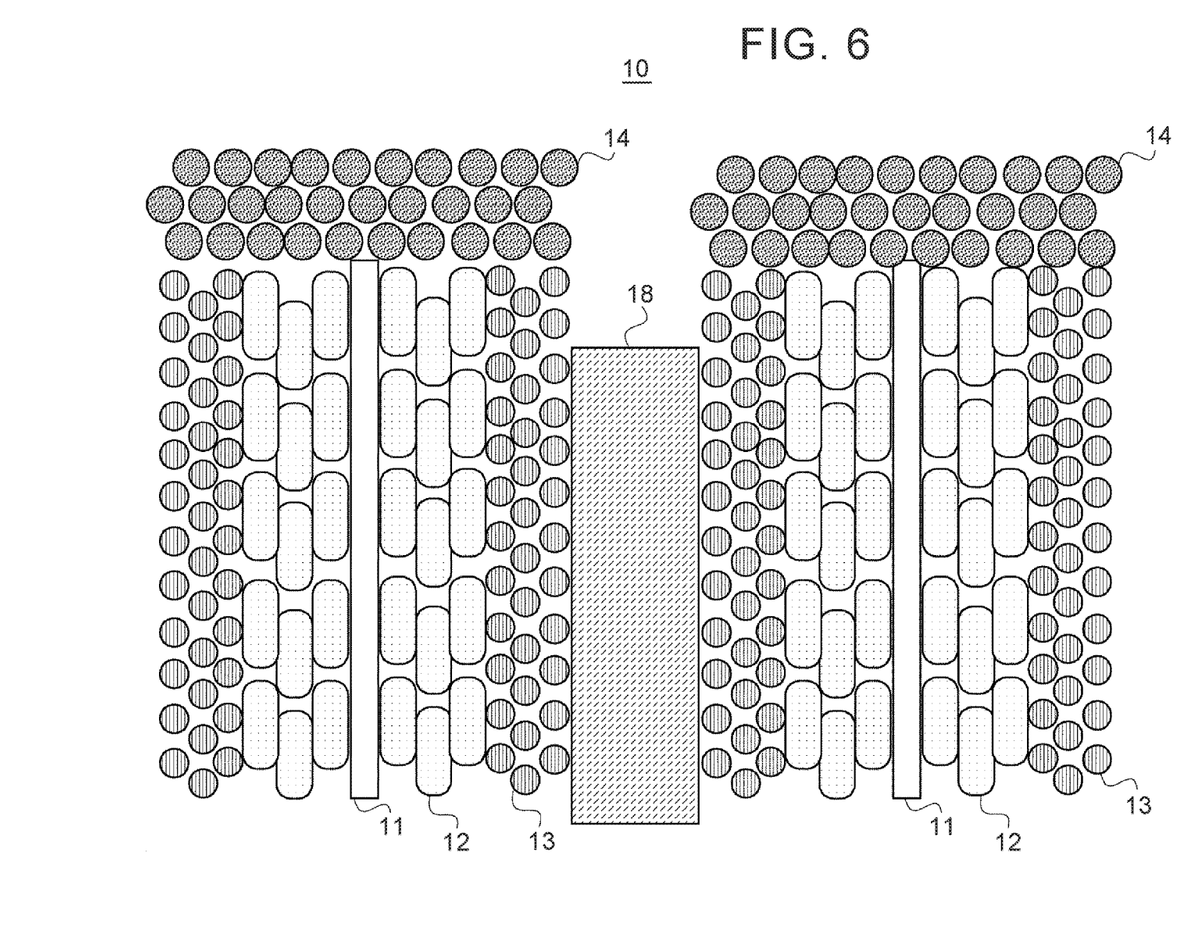
FIG. 6 is a sectional view showing the electrode and the spacer after the formation of an inorganic oxide particle layer.

Next, in Step S105 of FIG. 3, inorganic oxide particles having a higher melting point than the thermoplastic resin particles are applied to the first edge surface, and the inorganic oxide particle layer 14 is arranged thereon. FIG. 6 is a sectional view showing the electrode and the spacer after the formation of the inorganic oxide particle layer. As shown in FIG. 6, an end surface of the spacer 18 is positioned to be recessed from the first edge surface of the laminate. Therefore, the inorganic oxide particle layer 14 is formed only on the first edge surface of the laminate and is not formed on the end surface of the spacer 18. As a result, by performing the application once, the inorganic oxide particle layer 14 is formed on the first edge surface of the laminate without the inorganic oxide particle layer of one portion of the laminate being connected to the inorganic oxide particle layer of another portion of the laminate.

Accordingly, when the electrode is formed using a wound electrode, the inorganic oxide particle layer of one portion of the laminate is not connected to the inorganic oxide particle layer of another portion of the laminate. That is, a step of separating the inorganic oxide particle layer of one portion of the laminate from the inorganic oxide particle layer of another portion of the laminate is unnecessary.

After the inorganic oxide particle layer 14 is formed, the spacer 18 is removed from the electrode.

In this way, in the method of manufacturing an electrode according to the embodiment, the spacer having a flat shape is arranged in parallel at a position which is offset from the edge surface of the laminate including the current collector, the mixture layer, and the thermoplastic resin particle layer, the laminate and the spacer are alternately laminated, and the inorganic oxide particles are applied to the end surface of the laminate. As a result, by performing the application once, the inorganic oxide particle layer can be formed on the edge surface of the laminate.

In the above-described embodiment, in Step S104 of FIG. 3, the example of laminating another portion of the laminate on one portion of the laminate with the spacer interposed therebetween has been described. However, instead, another laminate may be laminated on the laminate with the spacer interposed between. For example, the spacer is arranged on the laminate including the positive electrode current collector, the positive electrode mixture layer, and the thermoplastic resin particle layer, and another separately prepared laminate including a positive electrode current collector, a positive electrode mixture layer, and a thermoplastic resin particle layer is laminated thereon. As a result, the laminate and the other laminate are laminated with the spacer interposed therebetween. In this case, in Step S105 of FIG. 3, inorganic oxide particles are applied to the first edge surface of the laminate and a second edge surface, which is on the same side of the first edge surface, of the other laminate. As a result, the inorganic oxide particle layer can be formed.

Next, temperature characteristics of an electrode body 10, which was actually manufactured, will be described.

First, polyethylene particles having a particle size of 2.5 μm in a particle size distribution d50 were mixed with carboxymethyl cellulose. As a result, a paste in which a mass ratio of the polyethylene particles to the carboxymethyl cellulose is 99.8:0.2 was prepared. This paste was applied to the positive electrode mixture layer 12 or to the negative electrode current collector 15 using a gravure coating method, and the thermoplastic resin particle layer 13 having a thickness of 25 μm was formed.

The inorganic oxide particle layer 14 formed of alumina was formed on the edge surface of the positive electrode. In the case of alumina, alumina particles having a particle size of 0.8 μm in a particle size distribution d50 were mixed with carboxymethyl cellulose. As a result, a paste in which a mass ratio of the alumina particles to the carboxymethyl cellulose is 99.6:0.4 was prepared. This paste was applied to the edge surface of the positive electrode using a spray coating method, and the inorganic oxide particle layer 14 having a thickness of 2 μm, 4 μm, or 8 μm was formed.

In a case where a polyethylene layer was formed instead of the inorganic oxide particle layer 14, as in the case of the thermoplastic resin particle layer 13, polyethylene particles having a particle size of 2.5 μm in a particle size distribution d50 were mixed with carboxymethyl cellulose. As a result, a paste in which a mass ratio of the polyethylene particles to the carboxymethyl cellulose is 99.8:0.2 was prepared. This paste was applied to the edge surface of the positive electrode using a gravure coating method, and a polyethylene layer having a thickness of 25 μm was formed instead of the inorganic oxide particle layer 14.

A battery was manufactured using the electrode body 10 in which the thermoplastic resin particle layer 13 and the inorganic oxide particle layer 14 were formed, conditions were adjusted to shut the battery down, and the battery was shut down at 130° C. Next, when the temperature of the battery increases and decreases, the maximum temperature is shown in Table 1 below. In Table 1, the electrode which is a target refers to an electrode in which the thermoplastic resin particle layer 13 is formed. In Comparative Examples 1 and 2, the edge surface of the positive electrode was exposed without arranging the inorganic oxide particle layer 14 on the edge surface of the positive electrode.

TABLE 1

| | Electrode As Target | Material of Short-Circuiting Preventing Wall | Thickness of Short-Circuiting Preventing Wall | Maximum Temperature (° C.) of Battery After Shutdown |
|---|---|---|---|---|
| Comparative Example 1 | Negative Electrode | None | None | 230 |
| Comparative Example 2 | Positive Electrode | None | None | 228 |
| Example 1 | Negative Electrode | Alumina | 2 | 164 |
| Example 2 | Negative Electrode | Alumina | 4 | 157 |
| Example 3 | Negative Electrode | Alumina | 8 | 153 |
| Comparative Example 3 | Negative Electrode | Polyethylene | 2 | 168 |
| Comparative Example 4 | Negative Electrode | Polyethylene | 4 | 161 |
| Comparative Example 5 | Negative Electrode | Polyethylene | 8 | 156 |
| Example 4 | Positive Electrode | Alumina | 2 | 169 |
| Example 5 | Positive Electrode | Alumina | 4 | 164 |
| Example 6 | Positive Electrode | Alumina | 8 | 157 |
| Comparative Example 6 | Positive Electrode | Polyethylene | 2 | 171 |
| Comparative Example 7 | Positive Electrode | Polyethylene | 4 | 166 |
| Comparative Example 8 | Positive Electrode | Polyethylene | 8 | 160 |

As shown in Table 1, in Comparative Examples 3 to 5 and 6 to 8, a polyethylene layer was formed instead of the inorganic oxide particle layer 14. In Examples 1 to 3 and 4 to 6, the inorganic oxide particle layer 14 was formed of alumina. When the layers having the same thickness are compared to each other, the maximum temperature of the battery after the shutdown in Examples is lower than that in Comparative Examples by 2° C. to 4° C.

In general, in a battery, the temperature of a position may be higher than that of a temperature measurement position. Therefore, it is preferable that the maximum temperature is as low as possible. It is preferable that a temperature tolerance for preventing the temperature of the battery to exceed a thermal runaway temperature is as large as possible. Accordingly, from the viewpoint of a battery, it is preferable that the maximum temperature of the battery after the shutdown is reduced even by 2° C. to 4° C.

In this way, in the battery according to the embodiment, the insulating porous inorganic oxide particle layer, which is made of particles having a higher melting point than the thermoplastic resin, is arranged on the edge surface of the laminate including the positive electrode current collector, the positive electrode mixture layer, and the porous thermoplastic resin particle layer which is made of plural particles of the thermoplastic resin. As a result, even after the electrode is heated by overcharging or the like, pores of the inorganic oxide particle layer are maintained. Therefore, satisfactory heat dissipation can be exhibited.

Figure 7:
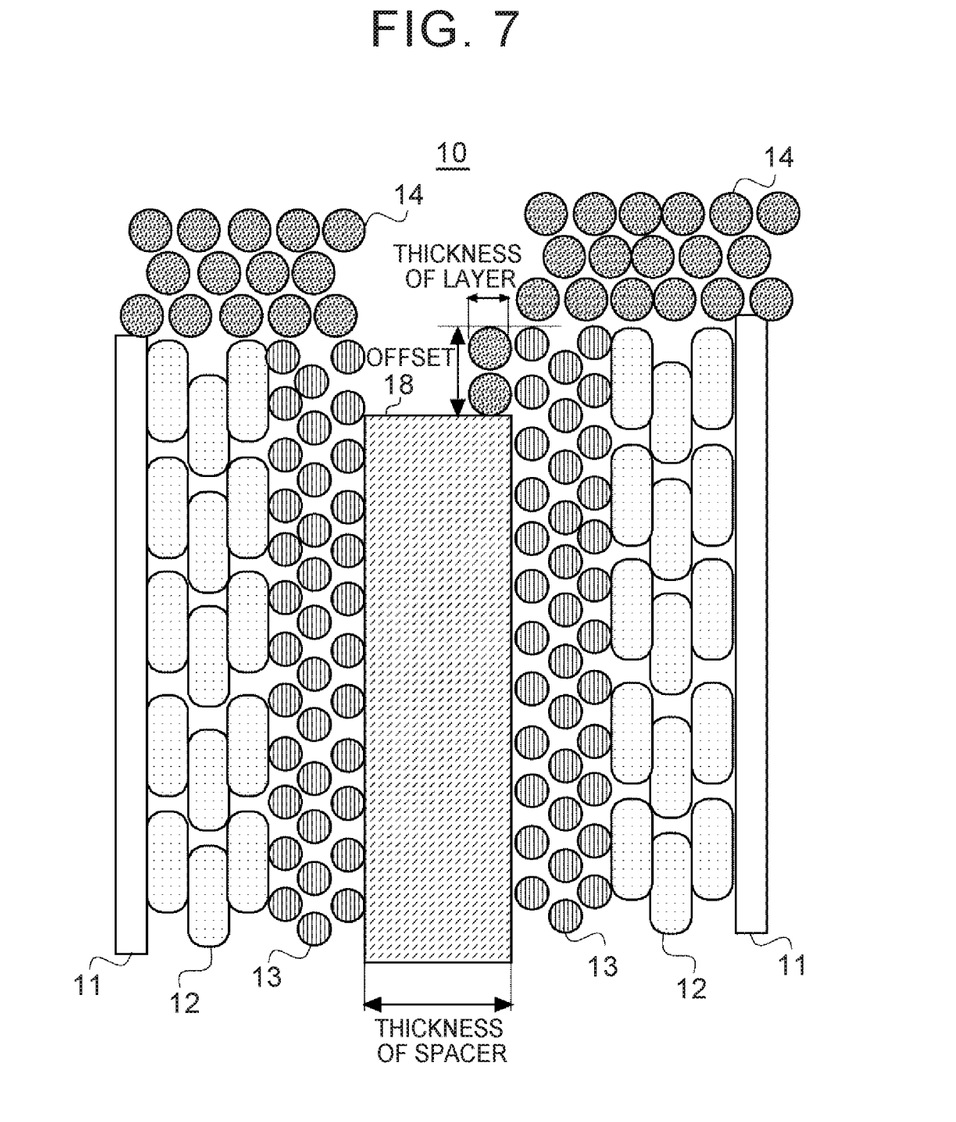
FIG. 7 is a sectional view showing the electrode and the spacer after the formation of the inorganic oxide particle layer.

Next, specific conditions for forming the inorganic oxide particle layer will be described. FIG. 7 is a sectional view showing the electrode and the spacer after the formation of the inorganic oxide particle layer. When the inorganic oxide particle layer 14 is formed, as shown in FIG. 7, the inorganic oxide particles flow from the edge surface of the thermoplastic resin particle layer 13 to the spacer 18 side, and a layer of the inorganic oxide particles may be formed between the portions of the laminate between which the spacer 18 is interposed.

While changing the thickness and the offset amount of the spacer, electrodes were formed to verify a state where the inorganic oxide particle layer was formed after flowing to the spacer side.

First, polyethylene particles were applied to each of the electrodes, and a thermoplastic resin particle layer having a thickness of 25 μm was formed. As the spacer, a polyethylene terephthalate film having a thickness of 5 μm, 10 μm, or 20 μm was arranged in an offset amount of 1 mm, 3 mm, 5 mm, or 10 mm from the laminate of the electrode. Next, the laminate and the film were wound.

In this wound state, alumina particles having a particle size of 0.8 μm in a particle size distribution d50 were mixed with carboxymethyl cellulose. As a result, a paste in which a mass ratio of the alumina particles to the carboxymethyl cellulose is 99.6:0.4 was prepared. This paste was applied to the edge surface of the positive electrode using an air spray and a syringe dispenser (slit width: 40 μm).

The obtained results are shown in Table 2.

TABLE 2

|  | Spacer | Thickness of Spacer (μm) | Offset Amount of Spacer (mm) | Thickness of Layer (μm) |
|---|---|---|---|---|
| Comparative Example 9 | None | None | None | 0 |
| Example 9 | Present | 5 | 1 | 0 |
| Example 10 | Present | 5 | 3 | 0 |
| Example 11 | Present | 5 | 5 | 1 |
| Example 12 | Present | 5 | 10 | 2 |
| Example 13 | Present | 10 | 1 | 1 |
| Example 14 | Present | 10 | 3 | 1 |
| Example 15 | Present | 10 | 5 | 2 |
| Example 16 | Present | 10 | 10 | 2 |
| Example 17 | Present | 20 | 1 | 2 |
| Example 18 | Present | 20 | 3 | 2 |
| Example 19 | Present | 20 | 5 | 2 |
| Example 20 | Present | 20 | 10 | 2 |

As shown in Table 2, regarding the thickness and the offset amount of each of the spacers, the thickness of a layer of the inorganic oxide particles which was formed after flowing to a gap between the portions of the laminate was 2 μm or less. In a case where the thickness of this layer is 3 μm or more, the thickness of the electrode increases, which is not preferable. In each of Examples 9 to 20, the thickness of the layer was 2 μm or less, and it can be seen that there is no effect on the thickness of the electrode. On the other hand, in Comparative Example 9 in which the spacer was not arranged, the inorganic oxide particle layer of one portion of the laminate was connected to the inorganic oxide particle layer of another portion of the laminate during the application of the inorganic oxide particles. As a result, the inorganic oxide particle layer was not able to be formed per laminate.

Next, an example of a nonaqueous electrolyte secondary battery in which the electrode according to the embodiment is used as a positive electrode will be described.

<Lithium Ion Secondary Battery 19>

Figure 8:
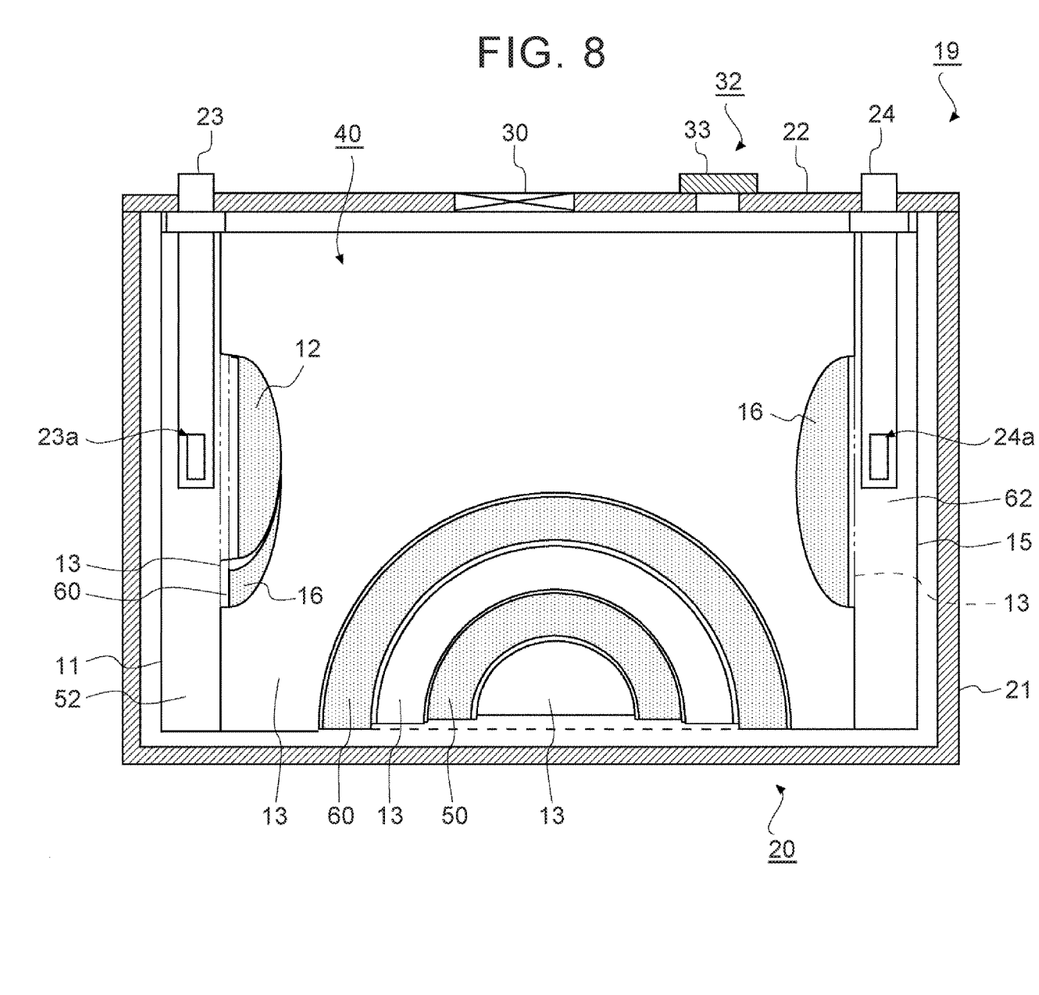
FIG. 8 is a sectional view showing a lithium ion secondary battery.
Figure 9:
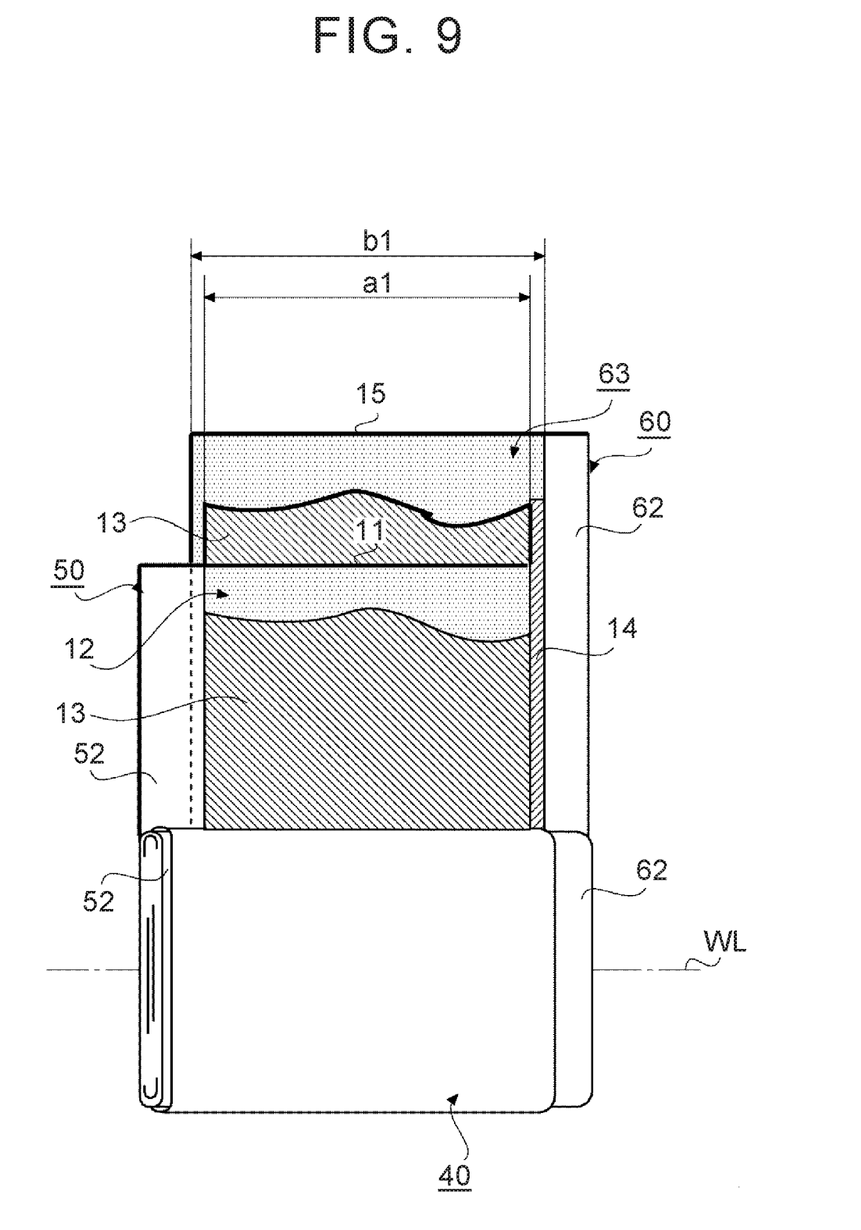
FIG. 9 is a diagram showing an electrode body provided in the lithium ion secondary battery.

FIG. 8 is a sectional view showing a lithium ion secondary battery 19. FIG. 9 is a diagram showing a wound electrode body 40 provided in the lithium ion secondary battery 19. In FIGS. 8 and 9, the same components as those in FIG. 1 are represented by the same reference numerals.

As shown in FIG. 8, the lithium ion secondary battery 19 includes a battery case 20 and a wound electrode body 40.

<Battery Case 20>

The battery case 20 includes a case body 21 and a sealing plate 22. The case body 21 has a box shape in which an opening is provided at an end. Here, the case body 21 has a bottomed cuboid shape in which an opening is provided at a surface corresponding to the top surface of the lithium ion secondary battery 19 in a usual operating state. In this embodiment, a rectangular opening is formed in the case body 21. The sealing plate 22 is a member for covering the opening of the case body 21. The sealing plate 22 is configured of a substantially rectangular plate. By the sealing plate 22 being welded to an opening periphery of the case body 21, the battery case 20 is configured to have a substantially hexahedral shape.

Regarding a material of the battery case 20, it is preferable that the battery case 20 contains a metal material having a light weight and high thermal conductivity as a major component. Examples of such a metal material include aluminum, stainless steel, and nickel-plated steel. The battery case 20 according to the embodiment (the case body 21 and the sealing plate 22) is formed of aluminum or an alloy containing aluminum as a major component.

In the example shown in FIG. 8, a positive electrode terminal 23 (external terminal) and a negative electrode terminal 24 (external terminal) are installed on the sealing plate 22 for external connection. A safety valve 30 and a liquid injection hole 32 are formed on the sealing plate 22. The safety valve 30 is configured to release an internal pressure of the battery case 20 when the inner pressure increases to be a predetermined level (for example, a set valve opening pressure of about 0.3 MPa to 1.0 MPa) or higher. FIG. 8 shows a state in which the liquid injection hole 32 is sealed by a sealing material 33 after an electrolytic solution is injected. In the battery case 20, the wound electrode body 40 is accommodated.

<Wound Electrode Body 40>

As shown in FIG. 9, the wound electrode body 40 includes: a belt-shaped positive electrode (positive electrode sheet 50); a belt-shaped negative electrode (negative electrode sheet 60); the thermoplastic resin particle layer 13 that separates the positive electrode and the negative electrode from each other; and the inorganic oxide particle layer 14 that is provided at an end portion of the thermoplastic resin particle layer 13.

<Positive Electrode Sheet 50>

The positive electrode sheet 50 includes the belt-shaped positive electrode current collector 11 and the positive electrode mixture layer 12. As the positive electrode current collector 11, a metal foil suitable for the positive electrode may be suitably used. As the positive electrode current collector 11, for example, a belt-shaped aluminum foil having a predetermined width and a thickness of about 15 μm may be used. An exposure portion 52 is set along one edge portion of the positive electrode current collector 11 in the width direction. In the example shown in the drawing, the positive electrode mixture layer 12 is formed on both surfaces of the positive electrode current collector 11 other than the exposure portion 52 set on the positive electrode current collector 11. Here, the positive electrode mixture layer 12 is arranged on the positive electrode current collector 11 and contains a positive electrode active material. In this embodiment, in the positive electrode mixture layer 12, a positive electrode mixture containing the positive electrode active material is applied to the positive electrode current collector 11. "The exposure portion 52" is the portion where the positive electrode mixture layer 12 is not arranged (applied or formed) on the positive electrode current collector 11.

<Negative Electrode Sheet 60>

As shown in FIG. 9, the negative electrode sheet 60 includes the belt-shaped negative electrode current collector 15 and the negative electrode mixture layer 16. As the negative electrode current collector 15, a metal foil suitable for the negative electrode may be suitably used. As the negative electrode current collector 15, a belt-shaped copper foil having a predetermined width and a thickness of about 10 μm may be used. An exposure portion 62 is set along one edge portion of the negative electrode current collector 15 in the width direction. The negative electrode mixture layer 16 is formed on both surfaces of the negative electrode current collector 15 excluding the exposure portion 62 set on the negative electrode current collector 15. The negative electrode mixture layer 16 is arranged on the negative electrode current collector 15 and contains a negative electrode active material. In this embodiment, in the negative electrode mixture layer 16, a negative electrode mixture containing the negative electrode active material is applied to the negative electrode current collector 15. "The exposure portion 62" is the portion where the negative electrode mixture layer 16 is not arranged (applied or formed) on the negative electrode current collector 15.

<Thermoplastic Resin Particle Layer 13>

As shown in FIG. 9, the thermoplastic resin particle layer 13 is a member which separates the positive electrode sheet 50 and the negative electrode sheet 60 from each other. The thermoplastic resin particle layer 13 corresponds to the thermoplastic resin particle layer 13 of FIG. 1. The thermoplastic resin particle layer 13 is configured of a belt-shaped sheet material having a predetermined width which has plural fine holes. In this example, as shown in FIG. 9, a width b1 of the negative electrode mixture layer 16 is slightly wider than a width a1 of the positive electrode mixture layer 12. Further, a width of the thermoplastic resin particle layer 13 is the same as the width a1 of the positive electrode mixture layer 12.

The thermoplastic resin particle layer 13 insulates the positive electrode mixture layer 12 and the negative electrode mixture layer 16 from each other and allows the movement of the electrolyte. Although not shown in the drawing, in the thermoplastic resin particle layer 13, a heat resistance layer may be formed on a surface of a substrate formed of a plastic porous film. The heat resistance layer contains a filler and a binder. The heat resistance layer will also be referred to as "HRL".

<Inorganic Oxide Particle Layer 14>

As shown in FIG. 9, the inorganic oxide particle layer 14 is arranged on one of the end portions of a laminate including the belt-shaped positive electrode current collector 11, the positive electrode mixture layer 12 and the thermoplastic resin particle layer 13 where the exposure portion 52 of the positive electrode is not present.

<Attachment of Wound Electrode Body 40>

In the embodiment, as shown in FIG. 9, the wound electrode body 40 is pressed to be bent flat along one plane including a winding axis WL. In the example shown in FIG. 9, the exposure portion 52 of the positive electrode current collector 11 and the exposure portion 62 of the negative electrode current collector 15 are spirally exposed on both sides of the thermoplastic resin particle layer 13, respectively. In the embodiment, as shown in FIG. 8, in the wound electrode body 40, intermediate portions of the positive and negative exposure portions 52, 62 which protrude from the thermoplastic resin particle layer 13 are collected and welded to tip end portions 23a, 24a of a positive electrode terminal 23 and a negative electrode terminal 24 which are arranged inside the battery case 20.

As shown in FIG. 8, the wound electrode body 40 is accommodated in the battery case 20. Further, the electrolytic solution is injected into the battery case 20. The electrolytic solution infiltrates into the wound electrode body 40 from both sides of the winding axis WL (refer to FIG. 9) in the axial direction.

The positive electrode current collector 11 and the negative electrode current collector 15 of the lithium ion secondary battery 19 are electrically connected to an external apparatus through the positive electrode terminal 23 and the negative electrode terminal 24 penetrating the battery case 20.

The invention is not limited to the above-described embodiment, and the embodiment can be appropriately modified within a range not departing from the scope of the invention. For example, in the example of the above-described embodiment, the thermoplastic resin particle layer and the inorganic oxide particle layer are provided in the positive electrode including the positive electrode current collector and the positive electrode mixture layer. However, the thermoplastic resin particle layer and the inorganic oxide particle layer may be provided in the negative electrode including the negative electrode current collector and the negative electrode mixture layer. In the above-described embodiment, alumina particles are used as the inorganic oxide particles. However, any particles can be used as long as they are insulating inorganic oxide particles having a higher melting point than the thermoplastic resin particle layer, and examples thereof include particles of silica ($SiO_2$), zirconia ($ZrO_2$), and titania ($TiO_2$).

The lithium ion secondary battery 19 shown in FIGS. 8 and 9 is merely an example of a secondary battery to which the electrode according to the invention is applicable, and does not limit the secondary battery to which the invention is applicable. For example, FIG. 8 shows the lithium ion secondary battery including the wound electrode body. However, the invention is also applicable to a laminated electrode body without being limited to the wound electrode body.

What is claimed is:

1. An electrode comprising:
   a current collector that is made of a conductive material;
   a mixture layer that contains an active material and is arranged on one surface of the current collector;
   a thermoplastic resin particle layer in which a plurality of insulating thermoplastic resin particles are arranged on the mixture layer;
   wherein the current collector, the mixture layer, and the thermoplastic resin particle layer are arranged as a laminate and layered in a laminating direction; and
   a porous inorganic oxide particle layer that contains a plurality of insulating inorganic oxide particles having a higher melting point than the thermoplastic resin particles, the porous inorganic oxide particle layer being disposed on an edge surface of the laminate, the edge surface being parallel to the laminating direction, so that the porous inorganic oxide particle layer disposed on the edge surface of the laminate has a higher melting point than the thermoplastic resin particle layer arranged on the mixture layer.

2. The electrode according to claim 1, wherein the electrode is a positive electrode.

3. The electrode according to claim 1, wherein the inorganic oxide particle layer has a wall shape covering an entire region of the edge surface.

4. The electrode according to claim 1, wherein the current collector has an exposure portion in which the mixture layer is not arranged, and
in the laminate, the edge surface is on a side opposite to a side where the exposure portion is present.

5. The electrode according to claim 1, wherein the porous inorganic oxide particle layer does not include the thermoplastic resin particles.

* * * * *